United States Patent
Kunimatsu

(10) Patent No.: US 11,064,088 B2
(45) Date of Patent: Jul. 13, 2021

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Akihiro Kunimatsu, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/748,121

(22) Filed: Jan. 21, 2020

(65) Prior Publication Data

US 2020/0252519 A1 Aug. 6, 2020

(30) Foreign Application Priority Data

Feb. 1, 2019 (JP) .............................. JP2019-017415

(51) Int. Cl.
*G06F 15/00* (2006.01)
*G06F 3/12* (2006.01)
*G06K 1/00* (2006.01)
*H04N 1/32* (2006.01)

(52) U.S. Cl.
CPC ....... *H04N 1/32117* (2013.01); *G06F 3/1206* (2013.01); *G06F 3/1222* (2013.01); *G06F 3/1239* (2013.01)

(58) Field of Classification Search
CPC .... G06F 3/1206; G06F 3/1239; G06F 3/1222; G06F 3/1228; G06F 3/1234; G06F 3/121; H04N 1/32117

USPC ............................ 358/1.13, 1.15, 1.14, 1.1
See application file for complete search history.

(56) References Cited

U.S. PATENT DOCUMENTS

| | | | |
|---|---|---|---|
| 10,042,590 B2 * | 8/2018 | Kawasaki | G06F 3/1238 |
| 2007/0024653 A1 * | 2/2007 | Kim | G06F 3/1209 |
| | | | 347/14 |
| 2010/0195132 A1 * | 8/2010 | Takashima | G06F 3/1255 |
| | | | 358/1.13 |
| 2017/0223210 A1 | 8/2017 | Yamada | |

FOREIGN PATENT DOCUMENTS

JP 2017-134718 A 8/2017

* cited by examiner

*Primary Examiner* — Douglas Q Tran
(74) *Attorney, Agent, or Firm* — Scully, Scott, Murphy & Presser, PC

(57) ABSTRACT

When a print instruction is input to a general-use printing program implemented in an OS, the supporting program implemented in a PC determines whether a switching condition is satisfied based on a print parameter or print data generated by the general-use printing program. The switching condition is a condition for switching a port to be used to transmit the print data from a first port to a second port. The first port is a port used by the general-use printing program. When it is determined that switching condition is satisfied, the supporting program switches the port to the second port, and performs a process for transmitting the print data to the printer.

16 Claims, 7 Drawing Sheets

| | ELEMENTS FOR SWITCHING CONDITION | | TRANSMITTING PORT | |
|---|---|---|---|---|
| (A) | COLOR SETTING | COLOR PRINTING | | SECOND PORT |
| | | MONOCHROME PRINTING | | FIRST PORT |
| (B) | RESOLUTION | HIGH RESOLUTION | | SECOND PORT |
| | | LOW RESOLUTION | | FIRST PORT |
| (C) | BOTH-SIDE PRINTING | BOTH-SIDE PRINTING | | SECOND PORT |
| | | ONE-SIDE PRINTING | | FIRST PORT |
| (D) | PRINT DATA EDITING PROCESS (RECEIPT OF EXECUTION COMMAND) | SPECIFIC DRAWING COMMAND IS INCLUDED | | SECOND PORT |
| | | SPECIFIC DRAWING COMMAND IS NOT INLUDED | | FIRST PORT |
| (E) | DATA FORMAT | PWG Raster DATA | | SECOND PORT |
| | | DATA OF OTHER THAN ABOVE FORMAT | | FIRST PORT |

FIG. 4

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application claims priority under 35 U.S.C. § 119 from Japanese Patent Application No. 2019-017415 filed on Feb. 1, 2019. The entire subject matter of the application is incorporated herein by reference.

BACKGROUND

Technical Field

The technical field disclosed in the present specification relates to a non-transitory computer-readable recording medium containing instructions realizing a support program which supports control of a printer, an information processing apparatus and a printing method.

Related Art

As a technique to control a printer from an information processing apparatus such as a personal computer, a configuration of installing a printer driver in the information processing apparatus, generating print data using the printer driver and transmitting the print data has been widely known. The printer driver is provided by a manufacturer of a printer and is adapted to various functions the printer has, and thus can make full use of the printer.

SUMMARY

Recently, a technique of controlling a printer using a general-use printing program which is standardly implemented in an operating system (OS), without using the above-mentioned printer driver, has been in practical use. According to such a technique, the OS associates a printer with the OS-standard general-use printing program. Thereafter, it becomes possible that, when the OS receives a print instruction corresponding to the printer, printing is executed using the OS-standard general-use printing program, without using the printer driver.

However, in the printing using the OS-standard general-use printing program, print data is transmitted using a port that a predetermined general-use printing program supports and printing is executed in a printer in accordance with a predetermined algorithm, but executed processes are not always the most suitable ones for the printer. Therefore, in the printing using the general-use printing program, there is room for improvement that makes the printer exert its inherent ability.

According to aspects of the present disclosure, there is provided a non-transitory computer-readable recording medium for an information processing apparatus. The information processing apparatus has a controller, the recording medium contains computer-executable instructions realizing a supporting program corresponding to a printer connected to the information processing apparatus. The supporting program, as executed by the controller, causes the information processing apparatus to perform a port process. The port process includes a determination process when a print instruction is input to a general-use printing program implemented in an operating system of the information processing apparatus, the print instruction being an instruction to cause a printer connected to the printer, the determination process being a process of determining whether a switching condition is satisfied based on print data generated by the general-use printing program in accordance with the print instruction or a print parameter indicated by the print instruction, the switching condition is a condition for switching a port to be used to transmit the print data from a first port to an other port different from the first port, the first port being a port used by the general-use printing program, and a switching process of switching the port to be used to transmit the print data to a second port different from the first port and transmitting the print data to the printer. In the port process, the switching process is performed when it is determined in the determining process that the switching condition is satisfied, and the switching process is not performed when it is determined in the determining process that the switching process is not satisfied.

BRIEF DESCRIPTION OF THE ACCOMPANYING DRAWINGS

FIG. 4 is a drawing showing examples of switching conditions.

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
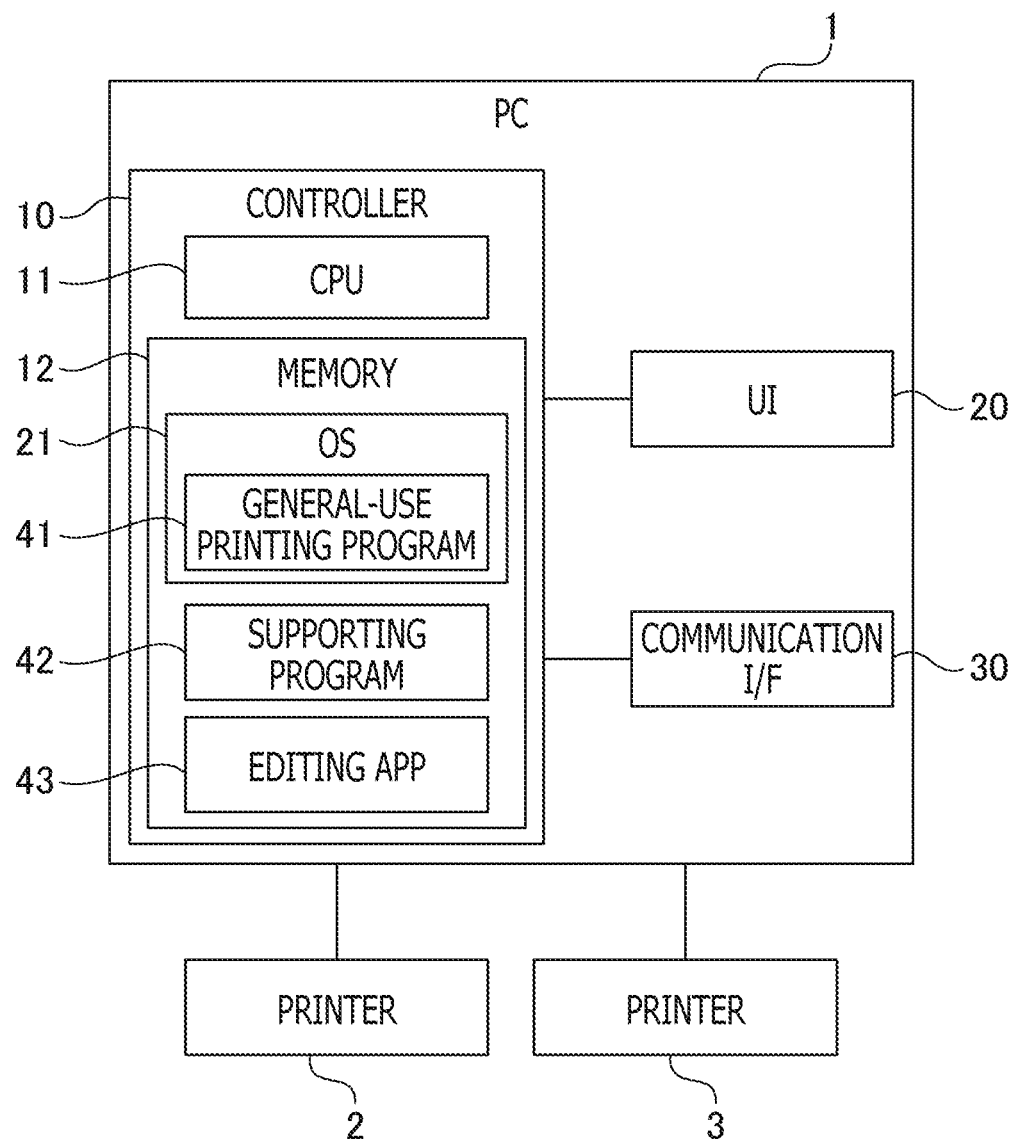
FIG. 1 is a block diagram showing an electrical configuration of a print system.

An example of a configuration of a print system in which programs according to a first embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard or a mouse having an input receiving function. The UI 20 is an example of a display of an information processing apparatus.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer drive, which supplied by a printer vendor, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, the editing APP 43 is configured to receive, through the UI 20, a print instruction which causes the printer 2 to execute printing.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Next, configuration of the supporting program 42 according to the first embodiment and an example of printing procedure including an operation of the supporting program 42 will be described with reference to a sequential chart shown in FIG. 2. The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the images. Then, the editing APP 43 which received the print instruction delivers a print execution notification indicating contents of the received print instruction to the OS 21. It is noted that, in FIG. 2, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, print queue information for identifying a print queue, information indicating print parameters set with the APP, information indicating image data subjected to be printed, and information for identifying a user who instructed to execute printing. It is noted that, as will be described later, these pieces of information are used in the supporting program 42 as well.

Upon receiving the print execution notification, the general-use printing program 41 generates print data being data for printers (arrow C). The general-use printing program 41 executes several types of processes when generating the print data.

Specifically, the general-use printing program 41 generates intermediate image data by converting a format of the image data included in the print execution notification to a format of the intermediate image data and generates a print job including the intermediate image data. There are various types of image data as the image data included in the editing APP 43, and the general-use printing program 41 converts the image data received from the editing APP 43 to the intermediate image data that is suitable for the generation of the print data. It is noted that, if the image data included in the print execution notification is suitable for the generation of the print data, generation process of the intermediate image data may be omitted and the image data may be directly used as the intermediate image data. The intermediate image data is, for example, XPS format data.

Further, the general-use printing program 41 identifies a printer designated as a device to be caused to execute printing based on the information included in the print execution notification. For example, when the printer 2 is designated as the device to be caused to execute printing, the general-use printing program 41 identifies the model of the printer 2 based on the model information of the printer included in the printer information stored in the memory 12. Then, since the supporting program 42 corresponds to the printer 2 designated by the print instruction is stored in the memory 12, before the general-use printing program 41 starts generating the print data, the general-use printing program 41 can output an execution command of processes of the supporting program 42 and activate the supporting program 42. In this case, the execution command is output from the general-use printing program 41 to the supporting program 42.

The supporting program 42 can execute a plurality of processes. For example, the supporting program 42 may execute a process for editing the print parameters and/or a process for editing an image of the intermediate image data after the generation of the intermediate image data and before starting the generation of the print data. For example, when editing the print parameters, the supporting program 42 reads out the print parameters, displays a setting screen regarding the read out print parameters on the UI 20, and receives changes in print parameters that have been set through the editing APP 43 and/or settings of print parameters that have not been received through the editing APP 43. Further, the supporting program 42 edits the print parameters of the print job based on contents received through the setting screen. The supporting program 42 may edit the print parameters by overwriting on the print parameters of the print job, or may edit the print parameters through the general-use printing program 41 by providing the print parameters to the general-use printing program 41. When editing the image of the intermediate image data, the supporting program 42 may process the image of the intermediate image data in accordance with settings of the print parameters. The image processing includes, for example, aggregation of images, division of an image, magnification/reduction of an image, and combining of an image such as a watermark. When terminating each process, the supporting program 42 transmits an end notification of the process to the general-use printing program 41. Upon receiving the end notification, the general-use printing program 41 reflects the edited content to the print job.

In the present embodiment, after the generation of the intermediate image data, the general-use printing program 41 activates the support program 42 as necessary and then generates the print data based on the intermediate image data. The print data generated by the general-use printing program 41 is print data of a format that can be used in printing with various types of printers. The print data is, for example, PWG Raster data or PDF data.

After the generation of the print data, the general-use printing program 41 outputs an execution command of a print data editing process to the supporting program 42 (arrow D). The print parameters and the print data are attached to the execution command of the print data editing process.

The supporting program 42 which received the execution command from the general-use printing program 41 starts the print data editing process (arrow E). The print data editing process is executed after the generation of the print data by the general-use printing program 41 is completed. The supporting program 42 can obtain the generated print data in addition to the print parameters and the information of the printer from the general-use printing program 41 through the execution command of the print data editing process.

For example, as the print data editing process, the supporting program 42 edits the print data. For example, the supporting program 42 adds a command for causing the printer 2 to execute a function unique to the printer 2 to the print data. The function unique to the printer 2 includes, for example, a toner saving function and a finisher function. If the printer 2 has functions of adding watermarks, header/footer and the like to an image by itself, in the print data editing process, commands for causing the printer 2 to execute these functions may be added to the print data.

Then, the supporting program 42 executes a port determination as a determination on whether to execute a substitutive transmission (arrow F). In the print system of the first embodiment, when a print instruction for causing the printer 2 to execute printing of an image is input to the general-use printing program 41, the supporting program 42 can transmit the print data directly to the printer 2 in place of the general-use printing program 41 transmitting the print data to the printer 2. The above-described print data transmission executed by the supporting program 42 on behalf of the general-use printing program 41 is herein referred to as the "substitutive transmission". It is noted that both the print data transmission by the supporting program 42 and the print data transmission by the general-use printing program 41 are actually executed through communication control by the OS 21. However, in the description, the communication control by the OS 21 is omitted.

Figure 3:
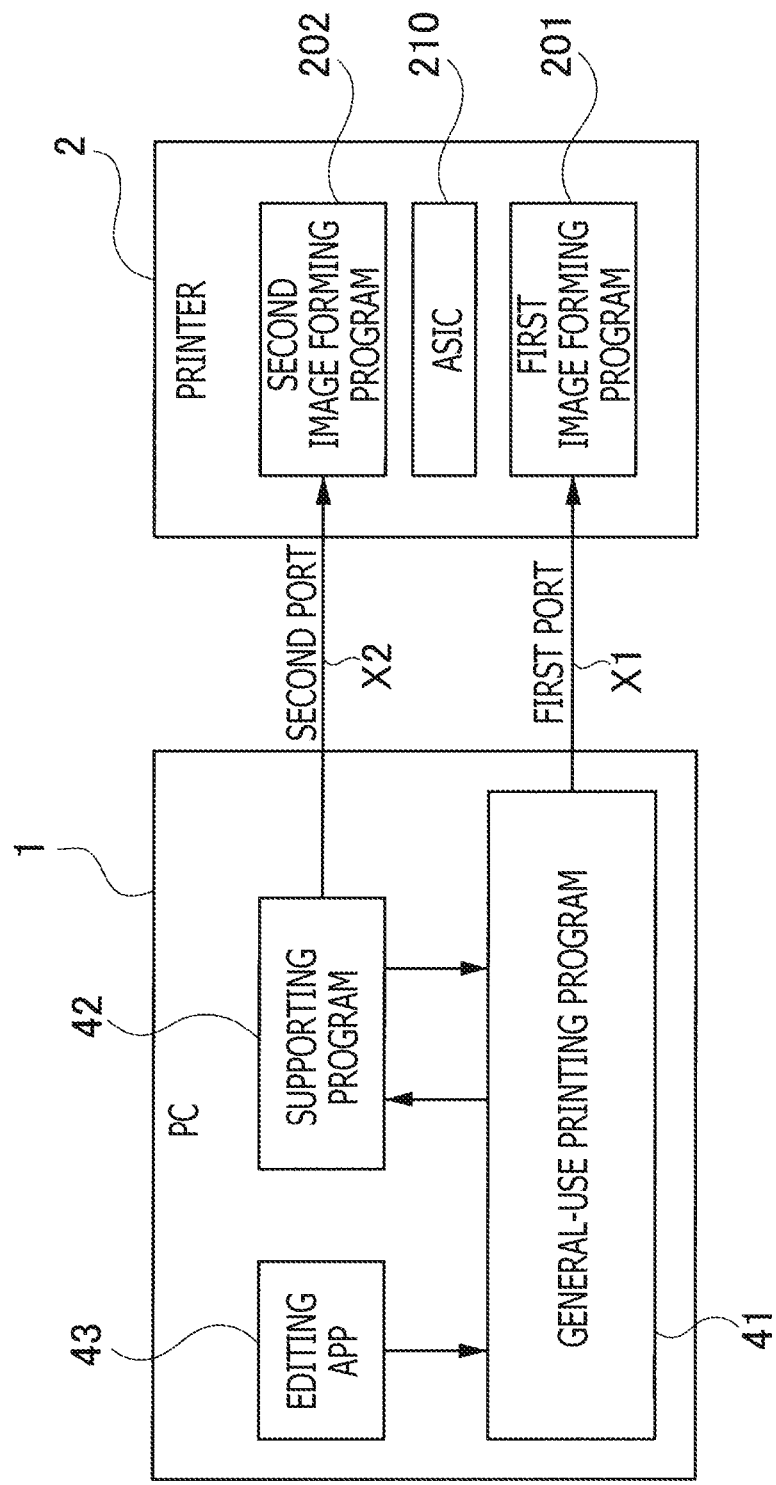
FIG. 3 is a drawing showing an outline of a substitutive transmission in a first embodiment.

As shown in FIG. 3, the print system of the first embodiment supports at least two paths as paths for transmitting the print data to the printer 2, namely, a first path X1 for transmitting the print data through a first port and a second path X2 for transmitting the print data through a second port. A path for transmitting the print data is determined by the supporting program 42 selecting a port. That is, it is determined to execute the substitutive transmission by the supporting program 42 selecting the second port.

In the print system of the first embodiment, among the ports to be selected by the supporting program 42, the first port is a port that the general-use printing program 41 uses for communication with a printer and is a port that is set to communicate using, for example, the IPP (Internet Printing Protocol). On the other hand, the second port is a port that the general-use printing program 41 does not use and is a port that is generally used in printing. For example, the second port is a port that is set to be used for RAW printing using port 9100 of the TCP or UDP. It is noted that the ports that are presented in the present embodiment are mere examples and thus other ports may be used. For example, as the second port, ports of other networks or ports other than those in the network, such as a USB port and a wireless communication port, may be used.

When the print data transmitted from the first port is received, the printer 2 executes image processing using a first image forming program 201 based on the received print data. When the print data transmitted from the second port is received, the printer 2 executes using a second image forming program 202 image processing based on the received print data. The first image forming program 201 and the second image forming program 202 are programs for executing image processing based on the print data transmitted from respective ports and are configured to execute processes in accordance with algorithms suitable for respective pieces of print data. Both the first image forming program 201 and the second image forming program 202 can use an ASIC 210 being a hardware configured to execute image processing. It is noted that the ASIC 210 can execute the image processing faster when the print data is received from the second image forming program 202.

It is noted that, in the present embodiment, the second port is appropriately selected because the ASIC 210 can execute processes faster when the print data is received from the second image forming program 202. Moreover, for example, if only the second image forming program 202 can use the ASIC 210 and the first image forming program 201 cannot use the ASIC 210, or if the printer 2 has respective dedicated ASICs for the first image forming program 201 and the second image forming program 202 and the ASIC for the second image forming program 202 can execute processes faster than the ASIC for the first image forming program 201, it is preferable that the second port is selected. Also, if a communication program or a communication hardware of the printer 2 can process the print data transmitted from the second port faster, it is preferable that the second port is selected.

Figure 2:
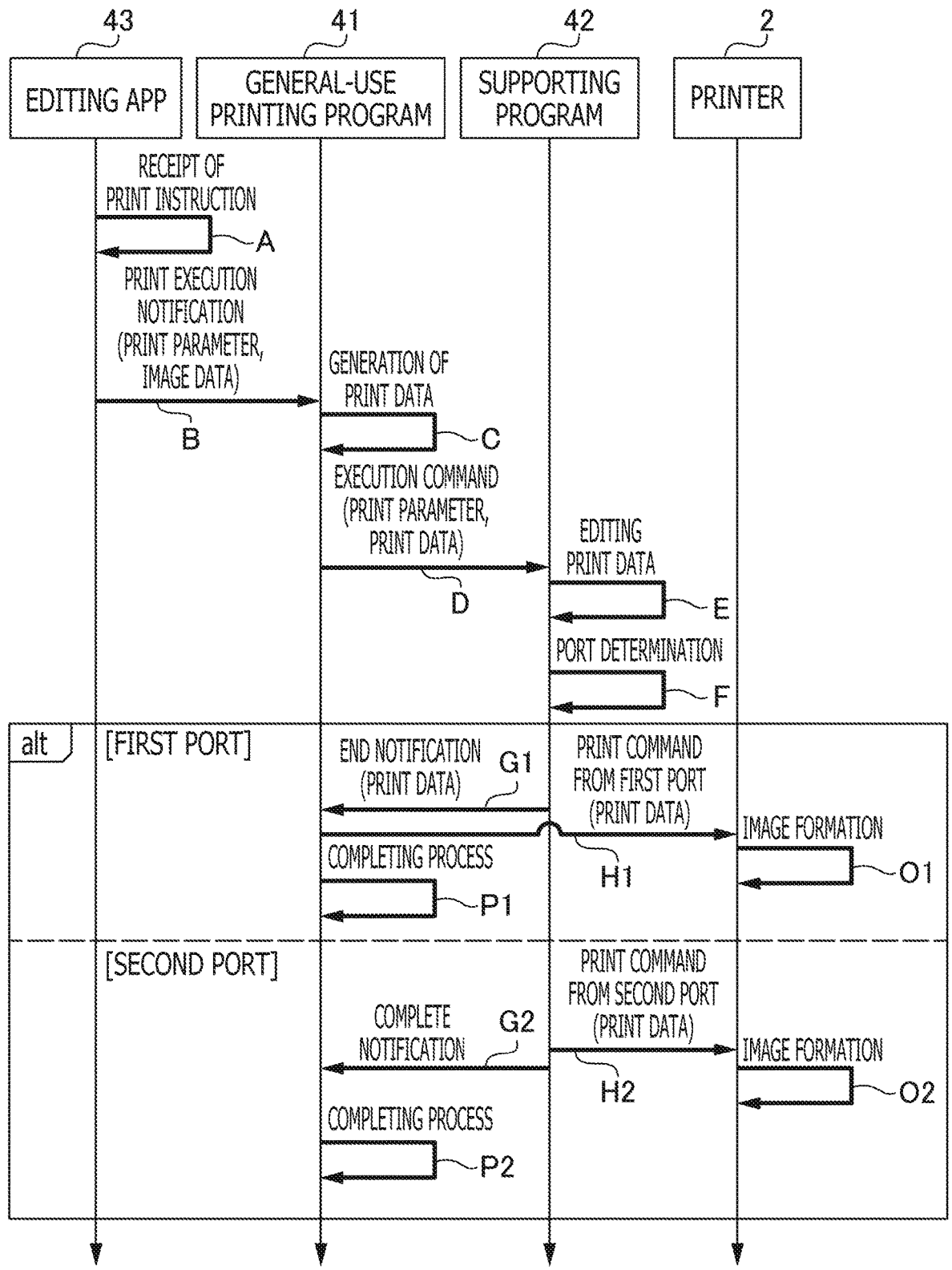
FIG. 2 is a sequential chart showing an example of an order of printing operations by the print system.

In the port determination at the arrow F in FIG. 2, the supporting program 42 determines whether a predetermined switching condition is satisfied based on the print parameters or the print data received from the general-use printing program 41. Examples of the switching conditions are shown in FIG. 4. For example, in the present embodiment, as shown in FIG. 4(A), a color printing setting in the print parameters can be used as the switching condition. In this case, when the color printing is set as the print parameter, the port to be used for communication is set to the second port, and when a monochrome printing is set as the print parameter, the port to be used for communication is set to the first port. Since, in general, it takes more time to execute processes in case of the color printing than in case of the monochrome printing, speed up of processing can be expected by causing the second image forming program 202 to execute processes using the ASIC 210.

As shown in FIG. 4 (B), a high resolution setting in the print parameters can also be used as the switching condition. In this case, when a high resolution is set as a value of the print parameter, the port to be used for communication is set to the second port, and when the high resolution is not set (or when a low resolution is set as a value of the print parameter), the port to be used for communication is set to the first port. The high resolution means that a value indicating a resolution is greater than a predetermined value. Since, in general, it takes more time to execute processes in case of the high resolution printing than in case of the low resolution printing, speed up of processing can be expected by causing the second image forming program 202 to execute processes using the ASIC 210.

Also, as shown in FIG. 4(C), speed up of processing can be expected if the second image forming program 202 executes processes using the ASIC 210 when executing both-side printing. Therefore, when the both-side printing is set as a value of the print parameter, the port to be used for communication may be set to the second port, and when one-side printing is set, the port to be used for communication may be set to the first port.

In case the print data includes a combination of a plurality of drawing commands (e.g., the print data consists of a combination of a plurality of drawing commands), the supporting program 42 may analyze the print data and determine whether the switching condition is satisfied or not based on the analysis result. For example, as shown in FIG. 4(D), whether a specific drawing command is included in the print data or not may be used as the switching condition. In this case, when the specific drawing command is included in the print data received from the general-use printing program 41, the port to be used for communication is set to the second port, and when the specific drawing command is not included, the port to be used for communication is set to the first port. This is because, depending on the content of the drawing command, speed up of the processing can be expected by applying an algorithm specific to a printer.

As shown in FIG. 4(E), whether the switching condition is satisfied or not may be determined by the data format of the print data. For example, assuming that high speed processing by the second image forming program 202 using the ASIC 210 is possible if the print data is PWG Raster data and high speed processing by the second image forming program 202 using the ASIC 210 is not possible if the print data is XPS data, when the print data is the PWG Raster data, it may be determined to transmit the print data through the second port. That is, the data format of the print data being the PWG Raster data is the switching condition for switching to the second port. It is noted that, if the supporting program 42 has a function of converting the XPS data to the PWG Raster data, it may be determined to transmit the print data through the second port even when the print data is the XPS data.

It can be determined whether to switch the port by using at least one of the switching conditions shown in FIG. 4. It is noted that a plurality of switching conditions may be combined. In this case, it can be determined whether to switch the port or not by setting priorities to the switching conditions.

Then, when it is determined to transmit the print data through the first port, since the substitutive transmission will not be executed, the supporting program 42 reflects the processed print data to the print job, returns an end notification indicating the end of the print data editing process to the general-use printing program 41, and terminates the process (arrow G1). The supporting program 42 may reflect the processed print data to the print job via the general-use printing program 41 by providing the processed print data to the general-use printing program 41.

In response to receiving the end notification from the supporting program 42, the general-use printing program 41 transmits a print command to the printer 2 (arrow H1). The printer 2 which received the print command executes image processing in accordance with the print data attached to the print command using the first image forming program 201 and executes formation of an image indicated by the print data (i.e., the printer 2 executes printing; arrow O1). It is noted that, if print data to which a command is attached is received, when executing printing, the printer 2 executes an operation indicated by the command. Further, the general-use printing program 41 executes a completing process in accordance the end notification (arrow P1).

On the other hand, when it is determined to transmit the print data through the second port, as the substitutive transmission, the supporting program 42 transmits the print command to the printer 2 through the second port without using the general-use printing program 41 (arrow H2). The printer 2 which received the print command executes image processing in accordance with the print data attached to the print command using the second image forming program 202 and executes printing of an image indicated by the print data (arrow O2).

Since the print data is directly transmitted from the supporting program 42 to the printer 2, as a notification different from the end notification shown at the arrow G1, a complete notification is input from the supporting program 42 to the general-use printing program 41 (arrow G2). Upon receiving the complete notification, the general-use printing program 41 executes a completing process in accordance with the complete notification (arrow P2). For example, in the completing process, the general-use printing program 41 terminates the print job based on the print execution notification input from the editing APP 43. At this time, the general-use printing program 41 stores information indicating that the print job to be terminated has been normally terminated in the memory 12 as history of the print job. Information indicating that the substitutive transmission has been executed by the second port may also be stored as the history.

It is noted that the supporting program 42 can also input a cancel notification indicating that a print job has been cancelled to the general-use printing program 41. For example, the supporting program 42 can receive cancelling of a print job through the setting screen for receiving editions of the print parameters and can input the cancel notification to the general-use printing program 41. The supporting program 42 can also input the cancel notification to the general-use printing program 41 in case the supporting program 42 failed to edit the intermediate image data. The receipt of cancelling of the print job and the failure of edition of the intermediate image data are examples of a cancel condition. The general-use printing program 41 to which the cancel notification is input terminates the print job as in the case where the complete notification is received. However, when the cancel notification is input, differently from the case where the complete notification is received, the general-use printing program 41 stores information indicating that the print job has been cancelled in the memory 12 as the history of the print job. That is, in case the transmission of the print data has been executed by the substitutive transmission, the complete notification different from the cancel notification is input from the supporting program 42 to the general-use printing program 41 as a notification to terminate the print job. The complete notification is an example of a first end notification, and the cancel notification is an example of a second end notification.

It is noted that, when transmitting the print data through the second port, the supporting program 42 may add a command for the second image forming program 202 to the print data, or may optimize the print data for the second image forming program 202. Such editions of the print data may be executed before the port determination or after the port determination.

Figure 5:
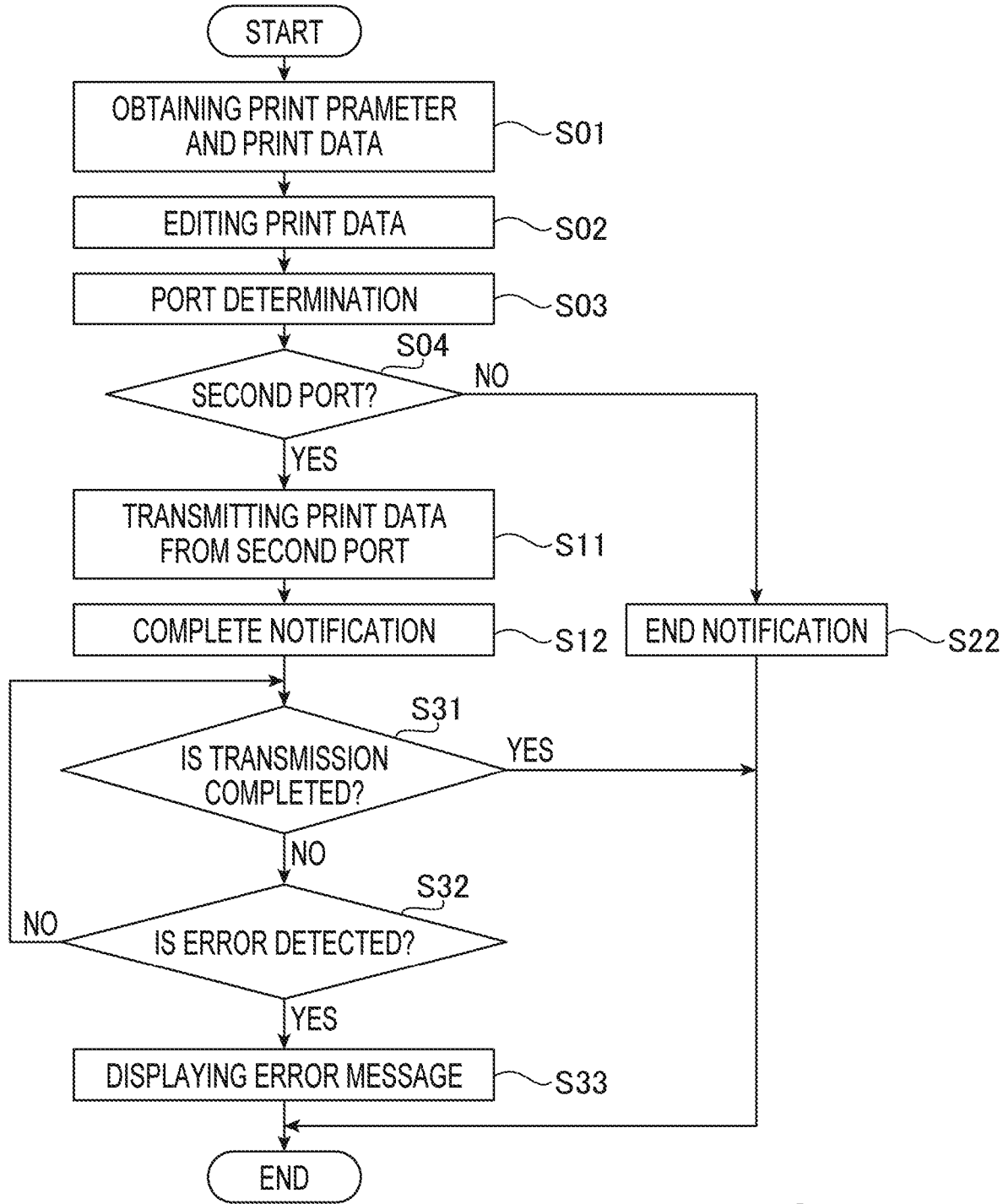
FIG. 5 is a flowchart showing a procedure of processes by a supporting program.

Next, a procedure of the print data editing process by the supporting program 42 when executing the above-described substitutive transmission will be described with reference to a flowchart shown in FIG. 5. The print data editing process is executed in the CPU 11 of the PC 1 upon receiving the execution command of the print data editing process from the general-use printing program 41 based on the print instruction. The print data editing process is an example of a port process.

In the print data editing process, the CPU 11 obtains values of print parameters and print data corresponding to the execution command (S01). Then, the CPU 11 edits the obtained print data (S02). For example, in S02, the CPU 11 adds a command for causing the printer 2 to execute a function unique to the printer 2 to the print data. The functions unique to the printer 2 include, for example, a both-side printing function, a toner save function and a finisher function. If the printer 2 has functions of adding watermarks, header/footer and the like to an image by itself and/or the printer 2 has functions of changing an image size such as an aggregation function and a magnification/reduction function, commands for causing the printer 2 to execute these functions may be added to the print data in S02. It is noted that, depending on values of the print parameters, the process of S02 need not be executed. S02 corresponds to the arrow E shown in FIG. 2.

The CPU 11 executes the port determination based on values of the print parameters or the print data received from the general-use printing program 41 (S03). The process of S02 and the process of S03 may be in inverse order or may be executed at the same time. S03 corresponds to the arrow F shown in FIG. 2. In the port determination, the above-described switching condition is used.

The supporting program 42 has a table 51 as shown in FIG. 4. In the table 51, the switching conditions and the ports to be used for the transmission of the print data are associated and, in the process of S03, the table 51 is read out. A specific parameter is a parameter, among the print parameters, corresponding to the switching condition. For example, if the switching condition is the color printing setting, the specific parameter is a parameter designating color printing or monochrome printing. Then, the CPU 11 extracts, from the print parameters, a value corresponding to the specific parameter and determines the port to be used for the transmission by referring to the read out table 51. For example, in case FIG. 4(A) is used as the switching condition, the port to be used for the transmission is set to the second port when the color printing is designated, and the port to be used for the transmission is set to the first port when the monochrome printing is designated. Which of the switching conditions to use may be set in the supporting program 42 in advance or the CPU 11 may let the user select which of the switching conditions to use.

The CPU 11 determines whether to execute the substitutive transmission using the second port or not in accordance with the determination result in S03 (S04). S03 and S04 are examples of a determination process. When it is determined not to execute the substitutive transmission using the second port (i.e., when it is determined to execute the substitutive transmission using the first port) (S04: NO), the CPU 11 inputs the end notification to the general-use printing program 41 (S22) and terminates the print data editing process.

On the other hand, if it is determined to execute the substitutive transmission using the second port (S04: YES), before returning the process to the general-use printing program 41, the CPU 11 transmits the print data to the printer 2 through the second port as a process by the supporting program 42 (S11). The CPU 11 also inputs the complete notification to the general-use printing program 41 (S12). The process of S11 and the process of S12 may be in inverse order or may be executed at the same time. S11 is an example of a switching process. The complete notification is an example of the first end notification, and S12 is an example of a first notifying process.

After S12, the CPU 11 determines whether the transmission of the print data is completed or not (S31). If the transmission of the print data is not completed (S31: NO), the CPU 11 determines whether an error has been detected during the transmission of the print data (S32). If it is determined that no error has been detected (S32: NO), the CPU 11 returns to S31 and repeats the processes until completion of the transmission of the print data or an error during the transmission of the print data is detected.

If an error is detected during the transmission of the print data (S32: YES), the CPU 11 causes the UI 20 to display a message indicating the error (S33). By displaying the error message using the supporting program 42, the user can recognize the error. S33 is an example of an error process. After S33, or when the transmission of the print data is completed (S31: YES), the CPU 11 terminates the print data editing process.

It is noted that the OS 21 has one or more print queues, each being associated to a printer and a port. For example, in the present embodiment, the OS 21 has two print queues for one printer 2, namely, a print queue associated to the printer 2 and the first port and a print queue associated to the printer 2 and the second port. The OS 21 has a function of sequentially transmitting print jobs registered to respective print queues to the printer.

Therefore, when it is determined to transmit the print data through the second port 2, the supporting program 42 may generate a new print job for transmitting the print data through the first port in place of transmitting the print command directly to the printer 2. Then, the supporting program 42 may register, without using the general-use printing program 41, the new print job with the print queue associated to the printer 2 and the second port. In this case, the print job registered to the print queue is transmitted to the printer 2 through the second port by the OS 21. In case the print job is to be directly registered to the print queue by the supporting program 42, opportunity to directly transmit the print data from the supporting program 42 decreases and thus loads on the supporting program 42 can be suppressed.

Next, the second embodiment will be described. In the second embodiment, the transmission of the print data through the first port is executed by the supporting program 42 as well. In this point, the second embodiment is different from the first embodiment in which the transmission of the print data through the first port is executed by the general-use printing program 41.

Figure 6:
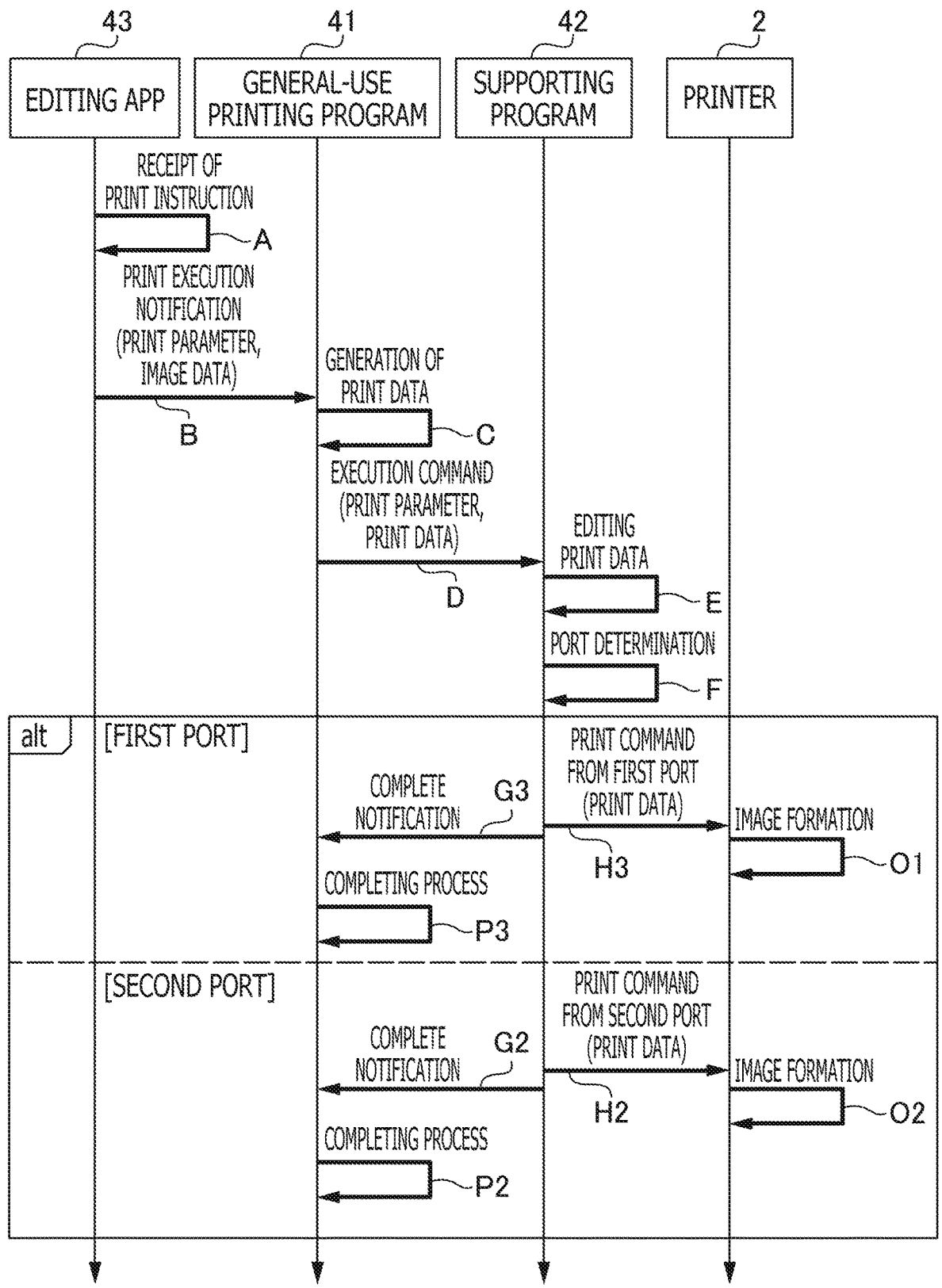
FIG. 6 is a sequential chart showing a procedure of a substitutive transmission in a second embodiment.

A procedure when executing the substitutive transmission in the second embodiment will be described with reference to FIG. 6. It is noted that, in FIG. 6, processes identical to those in FIG. 2 are assigned with the same numerals as in FIG. 2. Processes up to the port determination by the supporting program 42 (arrow F) are identical to those in the first embodiment and thus descriptions thereof are herein omitted. Also, processes for the transmission of the print data through the second port are identical to those in the first embodiment and thus descriptions thereof are herein omitted.

When it is determined to transmit the print data through the first port, the supporting program 42 transmits the print data to the printer 2 through the first port without using the general-use printing program 41 (arrow H3). The printer 2 which received the print data executes image processing using the first image forming program 201 and executes printing of an image indicated by the received print data (arrow O1).

Since the print data is directly transmitted from the supporting program 42 to the printer 2, the complete notification is input from the supporting program 42 to the general-use printing program 41 (arrow G3). The general-use printing program 41 to which the complete notification is input executes the completing process in accordance with the complete notification (arrow P3).

That is, in the second embodiment, the substitutive transmission by the supporting program 42 is executed when transmitting the print data through the first port as well. Therefore, as compared to the first embodiment, there is less opportunity to transmit the print data using the general-use printing program 41 and thus loads on the general-use printing program 41 can be suppressed.

Next the third embodiment will be described. In the third embodiment, the port determination result is attached to the end notification which is to be transmitted from the supporting program 42 to the general-use printing program 41. Then, when transmitting the print data through the second port, the general-use printing program 41 switches the port to the second port. This is the difference from the first and second embodiments in which the switching of the port is executed by the supporting program 42.

Figure 7:
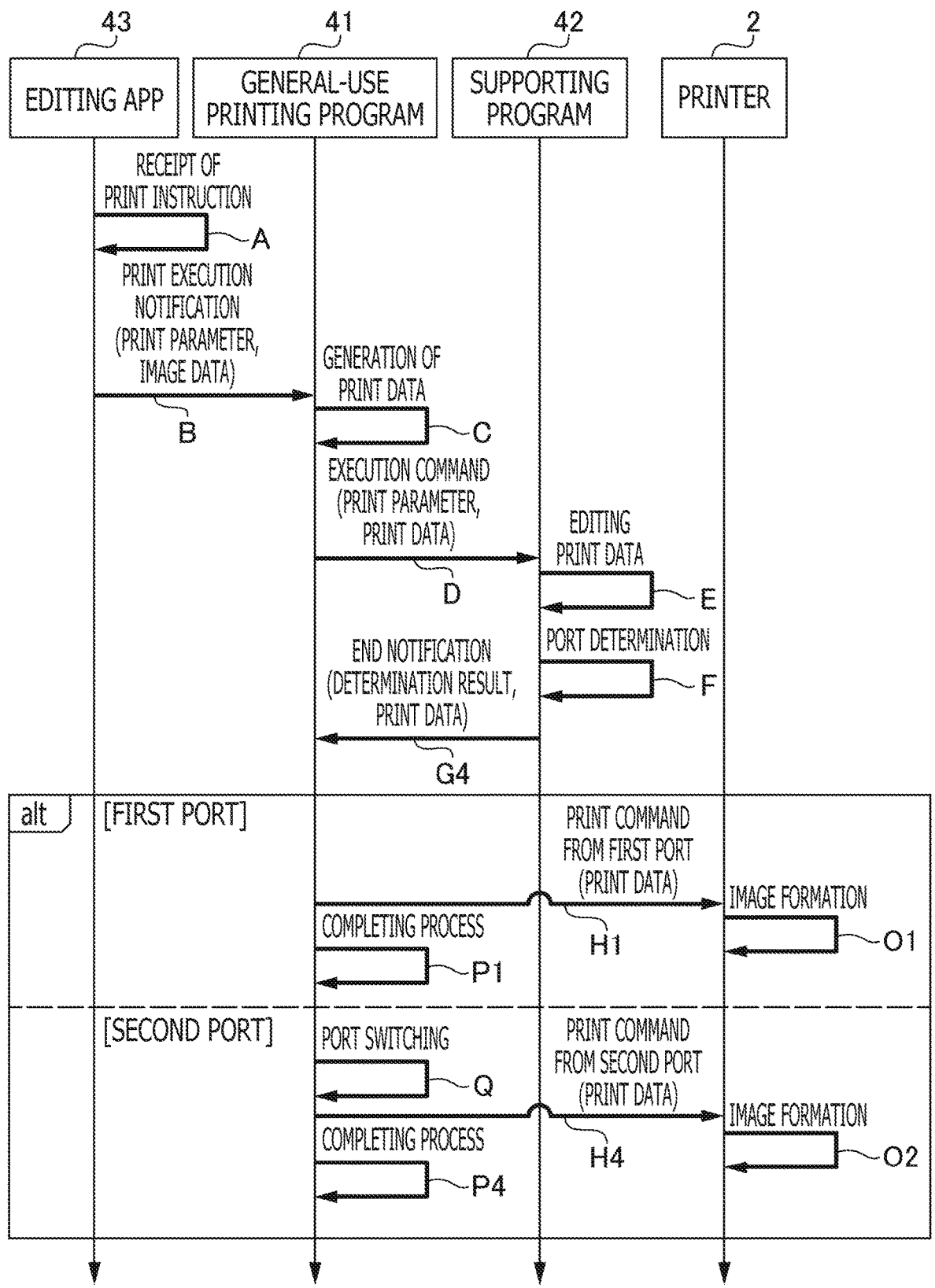
FIG. 7 is a sequential chart showing a procedure of a substitutive transmission in a third embodiment.

A procedure when executing the substitutive transmission in the third embodiment will be described with reference to FIG. 7. It is noted that, in FIG. 7, processes identical to those in FIG. 2 and/or FIG. 6 are assigned with the same numerals as in FIG. 2 and/or FIG. 6. Processes up to the port determination by the supporting program 42 (arrow F) are identical to those in the first embodiment and thus descriptions thereof are herein omitted.

After the port determination, the supporting program 42 outputs the end notification to the general-use printing program 41 (arrow G4). To the end notification, the port determination result is attached. When the port determination result indicating the first port is attached to the end notification, the general-use printing program 41 transmits a print command to the printer 2 through the first port (arrow H1). The printer 2 which received the print command executes printing of an image indicated by the received print data (arrow O1). The general-use printing program 41 executes the completing process (arrow P1). That is, if the supporting program 42 determines to transmit the print data through the first port, the same processes as in the case where the substitutive transmission is not executed will be executed.

On the other hand, if the port determination result indicating the second port is attached to the end notification, the general-use printing program 41 switches the port to be used to transmit the print data to the second port (arrow Q) and transmits a print command to the printer 2 through the second port (arrow H4). Specifically, the general-use printing program 41 registers a print job with the print queue corresponding to the second port. The end notification to which the port determination result indicating the second port is attached is an example of a switching request. The printer 2 which received the print job executes printing of an image indicated by the received print data (arrow O2). The general-use printing program 41 which has transmitted the print data executes the completing process in accordance with the end notification (arrow P4).

That is, in the third embodiment, the supporting program 42 inputs the port determination result to the general-use printing program 41, and the general-use printing program 41 switches the port in accordance with the port determination result and transmits the print data. Therefore, as compared to the first and second embodiments, there is no opportunity to directly transmit the print data from the supporting program 42 and thus loads on the supporting program 42 can be suppressed.

As described above in detail, according to the supporting program 42 of the present embodiments, the port determination is executed based on the print parameters and/or the print data, and the port to be used to transmit the print data is switched in accordance with the port determination result. Therefore, printing with a preferred algorithm for the printer 2 can be expected.

Further, the supporting program 42 of the first and second embodiments inputs the complete notification for terminating the print job to the general-use printing program 41 in case the general-use printing program 41 does not transmit the print data to the printer 2. Therefore, a state where the general-use printing program 41 is waiting for the transmission of the print data can be cancelled and thus double transmission of the print data to the printer 2 can be avoided.

It is noted that the embodiment disclosed in the present specification is only an illustrative examples and is not intended to limit aspects of the present disclosures. Accordingly, the technique disclosed in the present specification can be modified or enhanced without departing from aspects of the disclosures. For example, the device connected to the PC 1 need not be limited to the single-function printer but may be any device which has a printing function (e.g., an MFP, a copier, a facsimile machine and the like). Further, the number of printers connected to the PC 1 needs not be limited to that in the illustrated example but may be one or three or more.

Parts of each process described as the process executed by the general-use printing program 41 in the present embodiments may be a process executed by the OS 21. Further, the first port that the general-use printing program 41 uses may be used by the OS 21 or other programs.

A module that determines a print parameter is not limited to the supporting program 42 but may be a program that receives instructions form the OS 21 or the general-use printing program 41 when executing printing using the general-use printing program 41. For example, the module may be Print workflow of which specification is disclosed by Microsoft.

In the embodiments, the supporting program 42 is executed by the output of the execution command of the supporting program 42 from the general-use printing program 41. However, the execution condition of the supporting program 42 is not limited to the above. For example, the supporting program 42 may be directly executed by the OS 21 or may be a resident program. If the supporting program 42 is a resident program, the supporting program 42 may execute the aforementioned operations upon receiving execution commands.

In any of the flowcharts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, the recording medium containing computer-executable instructions comprising a supporting program corresponding to a printer connected to the information processing apparatus, the supporting program, as executed by the controller, causing the information processing apparatus to perform a port process including:
a determining process when a print instruction is input to a general-use printing program implemented in an operating system of the information processing apparatus, the print instruction being an instruction to cause a target printer, connected to the information processing apparatus and identified in the print instruction, to perform a print function, the determining process being a process of determining whether a switching condition is satisfied based on print data generated by the general-use printing program in accordance with the print instruction or a print parameter indicated by the print instruction, the switching condition is a condition for switching a port to be used to transmit the print data from a first port of the target printer to an other port of the target printer different from the first port, the first port being a port used by the general-use printing program; and
a switching process of switching the port to be used to transmit the print data to a second port of the target printer different from the first port and transmitting the print data to the printer,
wherein the switching process is performed when it is determined in the determining process that the switching condition is satisfied, and the switching process is not performed when it is determined in the determining process that the switching process is not satisfied, and
wherein the target printer performs the print function whether the print instruction is transmitted using the first port or the second port.

2. The non-transitory computer-readable recording medium according to claim 1,
wherein:
when it is determined in the determining process that the switching condition is satisfied, as the switching process, the print data is transmitted to the printer from the second port using the supporting program; and
when it is determined in the determining process that the switching condition is not satisfied, the print data is transmitted to the printer using the supporting program.

3. The non-transitory computer-readable recording medium according to claim 1,
wherein the port process includes a transmitting process of transmitting the print data to the printer from the first port,
wherein:
when it is determined in the determining process that the switching condition is satisfied, as the switching process, the print data is transmitted to the printer from the second port using the supporting program; and
when it is determined in the determining process that the switching condition is not satisfied, the transmitting process is performed.

4. The non-transitory computer-readable recording medium according to claim 2,
wherein the supporting program, as executed by the controller, causing the information processing apparatus to perform an error process when an error is detected during transmission of the print data by the supporting program, the error process being a process of displaying information indicating an error on a display of the information processing apparatus.

5. The non-transitory computer-readable recording medium according to claim 1,
wherein an operating system has a print queue associated with a print and a port,
wherein, in the switching process, a print job based on the print instruction is registered with a print queue corresponding to the printer and the second port without using the general-use printing program, the operating system transmitting a print job registered with the print queue to a printer corresponding to the print queue from a port corresponding to the print queue.

6. The non-transitory computer-readable recording medium according to claim 1,
wherein the supporting program, as executed by the controller, causing the information processing apparatus to perform a first notifying process when the print data is not transmitted from the general-use printing program in the switching process, the first notifying process being a process of inputting, to the general-use printing program, a first end notification to terminate a print job based on the print instruction, the general-use printing program terminating a print job based on the print instruction when receiving the first end notification.

7. The non-transitory computer-readable recording medium according to claim 6,
wherein the supporting program, as executed by the controller, causing the information processing apparatus to perform a second notifying process when a cancel condition of cancelling a print job based on the print instruction is satisfied, the second notifying process being a process of inputting a second end notification to the general-use printing program, the general-use printing program cancelling the print job based on the print instruction when receiving the second end notification, the second end notification being a notification different from the first end notification.

8. The non-transitory computer-readable recording medium according to claim 1,
wherein when it is determined in the determining process that the switching process is not satisfied, as the switching process, a switching request is input to the general-use printing program, the switching request being a request to change a port to be used to transmit the print data from the first port to an other port different from the first port, the general-use printing program transmitting the print data to the printer using the second port when receiving the switching request.

9. The non-transitory computer-readable recording medium according to claim 1,
wherein, in the determining process, the switching condition is satisfied when a particular parameter value is set to the print parameter indicated by the print instruction.

10. The non-transitory computer-readable recording medium according to claim 9,
wherein the print parameter includes a parameter designating one of color printing and monochrome printing, and
wherein the particular parameter value is a value designating the color printing.

11. The non-transitory computer-readable recording medium according to claim 9,
wherein the print parameter includes a parameter designating resolution of printing, and
wherein the particular parameter value is a value designating resolution higher that a particular value.

12. The non-transitory computer-readable recording medium according to claim 1,
wherein the print data includes data indicating an image, and
wherein, in the determining process, the switching condition is satisfied when a format of the data indicating the image is a particular format.

13. The non-transitory computer-readable recording medium according to claim 1,
wherein the print data includes data indicating an image, and
wherein, in the determining process, the switching condition is satisfied when the data indicating the image includes a particular feature.

14. The non-transitory computer-readable recording medium according to claim 1,
wherein the data indicating the image includes a combination of a plurality of drawing commands, and
wherein the particular feature is a particular drawing command.

15. An information processing apparatus having a controller,
wherein a supporting program corresponding to a printer connected to the information processing apparatus is implemented in the information processing apparatus,
wherein a printing program is implemented in an operating system of the information processing apparatus, and
wherein the controller performs a port process including:
a determining process when a print instruction is input to a general-use printing program implemented in an operating system of the information processing apparatus, the print instruction being an instruction to cause a target printer connected to the information processing apparatus and identified in the print instruction, to perform a print function, the determining process being a process of determining whether a switching condition is satisfied based on print data generated by the general-use printing program in accordance with the print instruction or a print parameter indicated by the print instruction, the switching condition is a condition for switching a port to be used to transmit the print data from a first port of the target to an other port of the target different from the first port, the first port being a port used by the general-use printing program; and
a switching process of switching the port to be used to transmit the print data to a second port of the target different from the first port and transmitting the print data to the printer,
wherein the switching process is performed when it is determined in the determining process that the switching condition is satisfied, and the switching process is not performed when it is determined in the determining process that the switching process is not satisfied, and
wherein the target printer performs the print function whether the print instruction is transmitted using the first port or the second port.

16. A printing method of controlling an information processing apparatus having a controller, a supporting program corresponding to a printer connected to the information processing apparatus being implemented in the information processing apparatus, a printing program being implemented in an operating system of the information processing apparatus,
wherein the method includes:
causing the printer to perform printing based on print data generated in the information processing apparatus; and
when a print instruction is input to a general-use printing program implemented in an operating system of the information processing apparatus, the print instruction being an instruction to cause a target printer connected to the information processing apparatus and identified in the print instruction, to perform a print function, determining, using the supporting program, whether a switching condition is satisfied based on print data generated by the general-use printing program in accordance with the print instruction or a print parameter indicated by the print instruction, the switching condition is a condition for switching a port to be used to transmit the print data from a first port of the target to an other port of the target different from the first port, the first port being a port used by the general-use printing program; and
switching the port to be used to transmit the print data to a second port of the target different from the first port and transmitting the print data to the printer,
wherein, switching the port to the second port is performed when determining that the switching condition is satisfied, and not switching the port to the second port is not performed when determining that the switching process is not satisfied, and
wherein the target printer performs the printing whether the print instruction is transmitted using the first port or the second port.

* * * * *